United States Patent [19]

Brown

[11] Patent Number: 4,597,702

[45] Date of Patent: Jul. 1, 1986

[54] CLIP FOR INSULATION HANGER

[75] Inventor: Eugene N. Brown, Broken Arrow, Okla.

[73] Assignee: Refractory Anchors, Inc., Broken Arrow, Okla.

[21] Appl. No.: 581,560

[22] Filed: Feb. 21, 1984

[51] Int. Cl.$^4$ .......................... F16B 21/18; E04B 5/00
[52] U.S. Cl. .................................... 411/529; 411/520; 52/410; 24/103
[58] Field of Search .............................. 411/520-526, 411/529, 510, 539, 337; 52/405, 410, 506, 509, 511, 512; 24/103, 104, 580, 586, 700, 701

[56] References Cited

U.S. PATENT DOCUMENTS

| | | | |
|---|---|---|---|
| 1,165,403 | 12/1915 | Hackney et al. | 411/529 |
| 2,709,390 | 5/1955 | Smith | 411/520 |
| 3,239,988 | 3/1966 | Meyer | 411/522 |
| 3,438,664 | 4/1969 | Meyer | 411/529 |
| 3,489,054 | 1/1970 | Feldman | 411/510 |
| 3,508,371 | 4/1970 | Meyer | 411/529 |
| 3,636,593 | 1/1972 | Buttriss et al. | 411/529 |
| 3,738,217 | 6/1973 | Walker | 52/506 |
| 4,018,023 | 4/1977 | Anderson | 52/410 |
| 4,030,261 | 6/1977 | Coleman | 52/511 |
| 4,139,975 | 2/1979 | Baker | 52/506 |
| 4,370,840 | 2/1983 | Bisbee et al. | 52/410 |

FOREIGN PATENT DOCUMENTS 597833  5/1960  Canada .............................. 411/529

Primary Examiner—Thomas J. Holko
Assistant Examiner—Neill Wilson
Attorney, Agent, or Firm—Head, Johnson & Stevenson

[57] ABSTRACT

A panel hanger assembly for attaching soft panels of insulation material to a structural surface, such as the metal wall of a furnace, the hanger assembly including an elongated stud member having one end for welding to the furnace wall and being pointed at the other end, the stud member being of generally rectangular cross-sectional configuration and having spaced apart pairs of opposed notches formed in the cross-sectional end walls, and a clip having an aperture therein, the first portion of the aperture being dimensioned to freely slidably receive the stud member thereon and the other portion of the aperture being longitudinal and adapted for slidably receiving the stud member at a notched area, the outer surface of the clip being configured to resist reverse lateral displacement of the clip relative to the stud so that when the clip is positioned on the stud to retain insulation previously impaled thereon, the clip is not inadvertantly disengageable from the stud.

3 Claims, 5 Drawing Figures

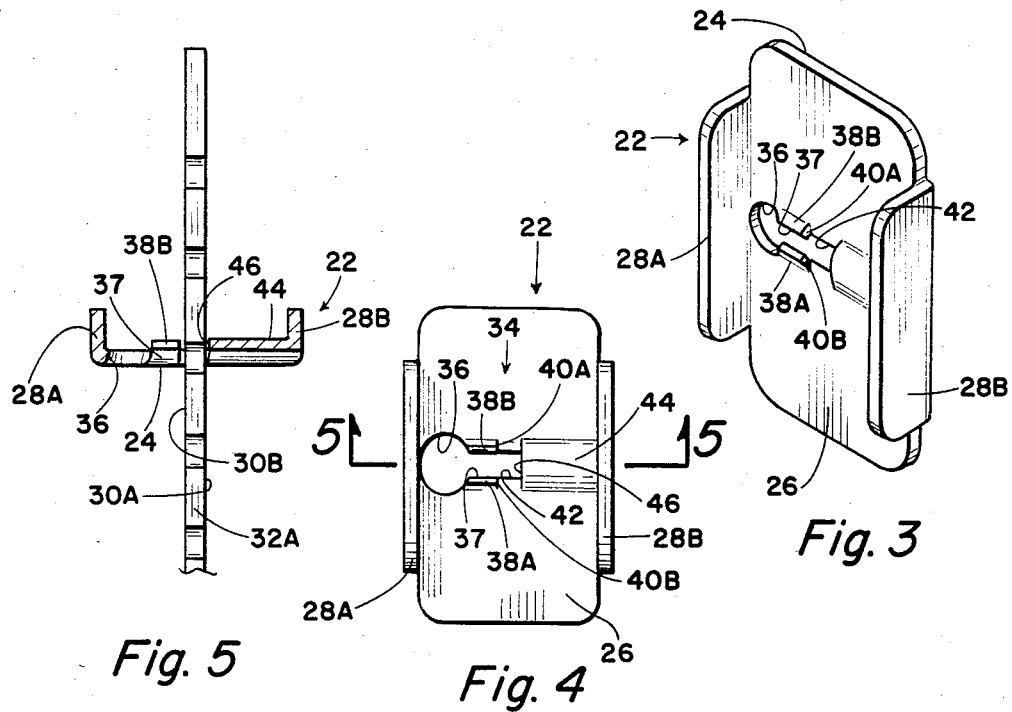
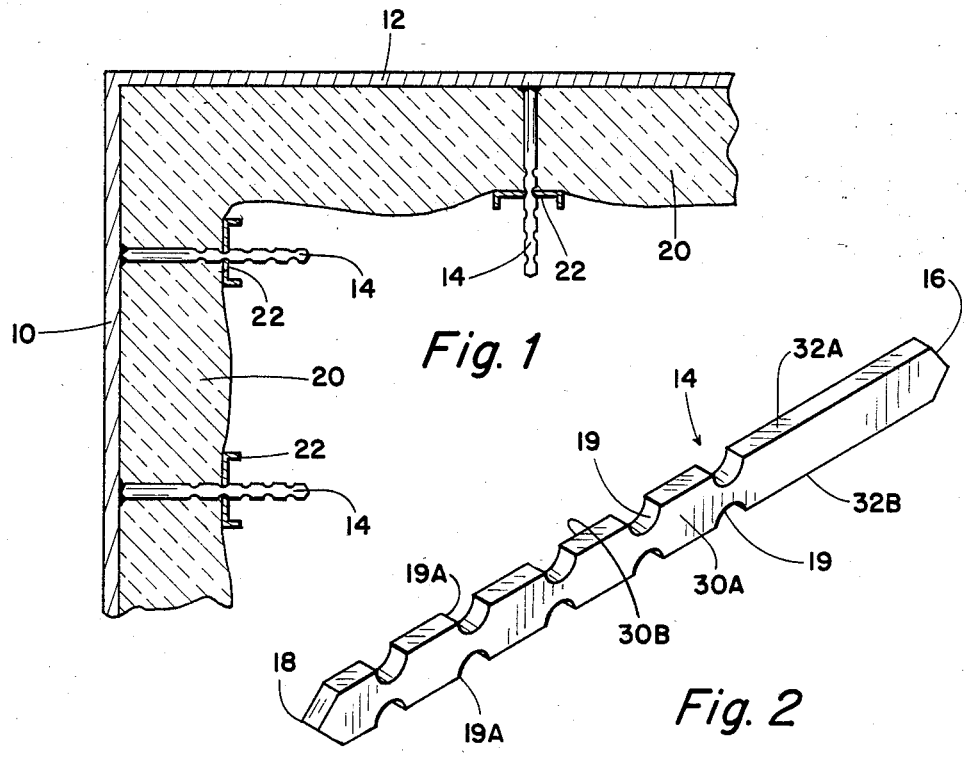

CLIP FOR INSULATION HANGER

BRIEF SUMMARY OF THE INVENTION

This invention is a device for mounting insulation on the walls and ceiling of an enclosure, such as a furnace. The assembly consists of a stud member and a clip. The stud member is an elongated member which is welded at one end to the wall of the furnace. The stud members are welded in spaced relationship and insulation is applied by forcing the blankets or panels past the pointed ends of the stud members so that the stud members impale the insulation. To keep the insulation on the stud members a retainer clip is provided. This clip is in the form of a flat member with opposed planar surfaces. The clip has an aperture therein. The invention is primarily concerned with the configuration of the aperture which is such that the clip can be mounted on the stud member and longitudinally slid into retained position without requiring the clip to be rotated relative to the stud and, when in position on the stud, resists inadvertant dislodgement.

The aperture has a first portion which is dimensioned to freely slidably receive a stud therethrough. The aperture is further defined by a laterally extending portion which is of width less than the normal width between the opposed end walls of the stud but of width less than that between pairs of notches. Thus the clip can be slid laterally relative to a stud at a pair of notches.

The outer surface of the clip is raised along portions of the laterally extending aperture. When the clip is installed on a stud it is moved laterally so that the stud passes, within the clip apertures, a first section of raised surfaces, after which the clip is moved relative to the stud into its locked position. When in the locked position this clip is non-rotatable relative to the stud and the raised surfaces on the clip resist reverse lateral movement of the stud, particularly in the presence of force applied against the clip rearward surface as would be occasion by the pressure of insulation blankets retained by the clip.

Thus the invention provides an improved means of mounting insulation on the wall of a furnace or the like employing a stud and a clip in which the clip is moved into locked position by lateral movement without requiring the rotation of the clip and in which the clip, when in the locked position, resists reverse lateral movement.

A better understanding of the invention will be had by reference to the following description and claims, taken in conjunction with the attached drawings.

DESCRIPTION OF THE DRAWINGS

FIG. 1 is an elevational partial cross-sectional view of a wall and the ceiling of a furnace showing the insulation hanger assembly of this invention used to retain blankets of insulation.

FIG. 2 is an isometric view of a stud as employed in the assembly.

FIG. 3 is an isometric view of the clip employed with the assembly the clip being attachable to the stud of FIG. 2 to hold the insulation in position.

FIG. 4 is a plan view of the clip of FIG. 3.

FIG. 5 is a cross-sectional view taken along the line 5—5 of FIG. 4 but showing the clip as positioned on a stud, with the clip in the locked position.

DESCRIPTION OF THE PREFERRED EMBODIMENT

Referring to FIG. 1 the wall 10 of an enclosure, such as a furnace or other area which needs to be well insulated is shown as well as a ceiling 12. The wall and ceiling are formed of metal, preferably of the type which can be welded to and in the typical construction the metal portions 10 and 12 form the outer surfaces of structural walls.

In order to insulate wall 10 and ceiling 12 a plurality of stud members 14 are employed. Each of the stud members, as shown in FIG. 2, includes an inner end 16, which is configured to be welded to wall 10 or ceiling 12, and a pointed outer end 18. The stud members 14 are welded in spaced apart rows on the walls and ceilings of the enclosure after which soft panel material, such as insulation 20, is installed by forcing the panels past the pointed ends 18 of the stud members. Thus the insulation 20 is impaled on the stud members 14.

To maintain the insulation 20 in position a clip 22 is positioned on each of the studs. Clip 22 is generally rectangular with an inner generally planar surface 24 and generally planar outer surface 26. The clip includes integral perpendicular extending opposed wing portions 28A and 28B to facilitate positioning the clip onto stud member 14.

Each of the stud members is of generally rectangular cross-sectional configuration having opposed side walls 30A and 30B and opposed end walls 32A and 32B. The spacing between end walls 32A and 32B is greater than that between the side walls 30A and 30B.

Formed in the end walls 32A and 32B of each stud member are pairs of opposed notches 19. The notches may be semi-circular as shown, or rectangular. Each notch forms a stud shoulder surface 19A at the end of the notch towards the stud outer end 18.

The assembly described up to this time is of a type described in patent. application Ser. No. 328,372 entitled "INSULATION HANGER ASSEMBLY", filed Dec. 7, 1981. Apparatus of a similar nature although employing a different means of attaching the clip to the stud, is illustrated in U.S. Pat. No. 3,738,217 entitled "INSULATION HANGER" issued June 12, 1973. The present invention is directed towards the unique means of attaching clips 22 to the stud members 14. This is accomplished by the arrangement of the aperture formed in clip member 22 and to the configuration of the clip member outer surface 26.

The aperture is generally indicated by the numeral 34 and includes a first portion 36 which is of dimensions to freely slidably receive a stud member 14. Adjacent to and extending from the first portion 14 is an aperture second portion 36 which is of width less than the width between the stud end walls 32A and 32B but which is greater than the width of the stud between pairs of apertures 19.

Formed on the clip outer surface 26 adjacent the aperture second portion 36 are opposed raised portions 38A and 38B. These raised portions provide locking surfaces 40A and 40B.

Aperture 34 has a third portion 42 which is a lateral extension of the second portion 37 and of similar width. Formed in the clip member outer surface 26 is a second raised portion 44 providing a second locking surface 46.

When a clip 22 is assembled on a stud member 14 on the stud passes through aperture 36 with the insulation being compressed to the desired extend and to a point wherein the clip is coincident with a pair of notches 19. At the notch the clip is laterally moved relative to the stud member so that the notch portion passes through the aperture second portion 47 until the stud is within the aperture third portion 42 as shown in FIG. 5. When in this position the clip is released. The clip is thereafter held nonrotatably by the stud. The locking surfaces 40A and 40B, in conjunction with locking surface 46, serve to prevent the rotation of the clip and also serve to prevent reverse lateral movement of the clip relative to the stud. This reverse lateral movement resistance is particularly pronounced due to the force of the insulation 20 against the clip rearward surface 24.

Thus the invention provides a unique means of mounting a clip on a stud without requiring rotatable motion and in a manner which substantially eliminates the possibility of the clip being thereafter inadvertantly dislodged from the stud. At the same time, the clip can be installed very expeditiously, in a matter of seconds, without requiring the use of tools or other devices.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A panel hanger assembly for attaching soft panel material such as insulation to a structural surface, said assembly comprising:

an elongated stud member having an outer end suitable for impaling a panel and an inner end attachable to a structural surface, the stud member having a substantially rectangular cross-sectional shape with opposed side walls and opposed end walls, the width between the end walls being greater than the thickness between the side walls, a plurality of pairs of opposed notches being provided in the stud end walls, each pair of opposed notches forming a stud shoulder surface at the outer end of the notches;

a metal retainer clip having a flat inner surface and a generally flat outer surface and being of generally uniform thickness less than the length of said notches and having an aperture therein, the aperture having a first portion adjacent one edge of the clip of dimensions to freely receive said stud, the aperture having a second portion adjacent to and communicating with said first portion, said second portion having a width which is greater than the width of said stud at a said pair of notches but which is less than the normal width of said stud measured between said end walls, portions of said outer surface adjacent both sides of said aperture second portion being outwardly bent to provide locking surfaces opposite said aperture first portion, and said aperture having a third portion contiguous to and communicating with said second portion, said third portion being of width less than the normal width of said stud end walls and greater than the width between opposed notches, whereby said clip can be inserted onto a said stud by passing said stud through said aperture first portion to a selected pair of notches, after which said clip can be moved laterally relative to said stud, said stud at a pair of notches passing past said aperture second portion and into said aperture third portion without rotation of said clip, said stud shoulder surfaces engaging said clip and said clip being retained in a non-rotatable position by said clip locking surface.

2. A panel hanger assembly according to claim 1 wherein said clip outer surface is outwardly bent adjacent to said aperture third portion to provide a second locking surface spaced from said first locking surface a distance slightly greater than the thickness of said stud measured between said side walls.

3. A panel hanger assembly for attaching soft panel material, such as insulation, to a structural surface, said assembly comprising:

an elongated stud member having an outer end suitable for impaling a panel and an inner end attachable to a structural surface, the stud member having a substantially rectangular cross-sectional shape with opposed sidewalls and opposed end walls, the width between the end walls being greater than the width between the sidewalls, the stud member having a plurality of pairs of opposed notches forming stud shoulder portions at the outer end of the notches;

a metal retainer clip having generally planar inner and outer surfaces and of generally uniform thickness less than the length of said notches, and having an elongated transverse aperature therein, the first part of the aperture being dimensioned to receive said stud therethrough, and the second portion of the aperture which communicates with said first portion being of width greater than said stud at said notches but less than the width of said stud measured between said end walls whereby said clip can be laterally moved relative to said stud at a said pair of notches, and means to retain said clip against rotation thereof relative to said stud and bent portions on said clip to resist reverse lateral movement in the presence of force of panel material applied against its inner surface.

* * * * *